(12) United States Patent
Farahmand et al.

(10) Patent No.: US 7,865,835 B2
(45) Date of Patent: Jan. 4, 2011

(54) SYSTEM AND METHOD FOR HYDROLOGICAL ANALYSIS

(75) Inventors: Touraj Farahmand, Burnaby (CA); Peter Hudson, Vancouver (CA); Edward J Quilty, Vancouver (CA)

(73) Assignee: Aquatic Informatics Inc., Vancouver (CA)

( * ) Notice: Subject to any disclaimer, the term of this patent is extended or adjusted under 35 U.S.C. 154(b) by 639 days.

(21) Appl. No.: 11/924,592

(22) Filed: Oct. 25, 2007

(65) Prior Publication Data

US 2009/0113332 A1  Apr. 30, 2009

(51) Int. Cl.
G06F 3/048 (2006.01)
(52) U.S. Cl. ............... 715/763; 715/735; 715/835; 715/810
(58) Field of Classification Search ............... 715/700, 715/763, 764, 765, 781, 810, 835, 846, 967
See application file for complete search history.

(56) References Cited

U.S. PATENT DOCUMENTS

| | | | |
|---|---|---|---|
| 4,761,748 A | 8/1988 | Le Rat et al. | |
| 5,047,930 A | 9/1991 | Martens et al. | |
| 5,787,412 A | 7/1998 | Bosch et al. | |
| 6,073,262 A | 6/2000 | Larkin et al. | |
| 6,332,110 B1 | 12/2001 | Wolfe | |
| 6,560,543 B2 | 5/2003 | Wolfe et al. | |
| 6,687,585 B1 | 2/2004 | Rizzoni et al. | |
| 6,766,230 B1 | 7/2004 | Rizzoni et al. | |
| 6,889,141 B2 | 5/2005 | Li et al. | |
| 6,904,370 B1 * | 6/2005 | Levinson et al. | 702/19 |
| 6,947,842 B2 | 9/2005 | Smith et al. | |
| 6,954,701 B2 | 10/2005 | Wolfe | |
| 7,134,086 B2 | 11/2006 | Kodosky | |
| 7,389,204 B2 | 6/2008 | Eryurek et al. | |
| 7,454,295 B2 | 11/2008 | Wolfe | |
| 2003/0071844 A1 | 4/2003 | Evans | |
| 2004/0059654 A1 * | 3/2004 | Schroder et al. | 705/35 |

(Continued)

FOREIGN PATENT DOCUMENTS

CA 2355199 6/2000

(Continued)

OTHER PUBLICATIONS

Author Unknown, Water Resources Surface Water Software, U.S. Geological Survey (USGS) web site, http://water.usgs.gov/software/lists/surface_water/.

(Continued)

Primary Examiner—X. L Bautista
(74) Attorney, Agent, or Firm—Fasken Martineau DuMoulin LLP

(57) ABSTRACT

A computer-based graphical user interface for graphically controlling processing of hydrological data, comprising a display menu interface listing executable tools from the group comprising one or more of: hydrological data input, hydrological data validity checking and correction, and hydrological modeling, a GUI for selecting and arranging tools from the display menu in a graphical display area to construct a hydrological process, the selected tools each being represented by icons on the graphical display, and for establishing a connection between at least one output of a first tool and an input of a second tool said tools by graphically displaying the connection between said tools representative icon and input means for receiving user input to arrange and execute said constructed hydrological data processing process.

11 Claims, 12 Drawing Sheets

U.S. PATENT DOCUMENTS

2005/0273300 A1* 12/2005 Patwardhan et al. ............ 703/9
2008/0168339 A1    7/2008 Hudson

FOREIGN PATENT DOCUMENTS

CA   2280595 A1   2/2001
WO   9527254 A1   10/1995
WO   0217125      2/2002

OTHER PUBLICATIONS

Hudson, Peter, et al., Automated Validation and Grading of Aquatic Time Series Using a Probabilistic Parity Space Method, Presented by Touraj Farahmand at the 5th National Monitoring Conference, May 2006, San Jose, California, U.S.A.

* cited by examiner

SYSTEM AND METHOD FOR HYDROLOGICAL ANALYSIS

The present invention relates to the field of hydrology and environmental science, and more particularly to a system and method for controlling processing of hydrological data.

BACKGROUND OF THE INVENTION

In the field of hydrology, hydrologists and other environmental scientists apply scientific knowledge and mathematical principles to solve water-related problems such as quantity, quality and availability. They may be concerned with finding water supplies for cities or irrigated farms, or controlling river flooding or soil erosion. Or, they may work in environmental protection: preventing or cleaning up pollution or locating sites for safe disposal of hazardous wastes.

Much of an hydrologist or environmental scientists work relies on computers for organizing, summarizing and analyzing masses of data collected from rivers, water wells and weather stations, and for modeling studies such as the prediction of flooding and the consequences of reservoir releases or for example the effect of leaking underground oil storage tanks.

The data is collected in one of two ways, by manual field measurements or by aquatic monitoring sensors. The latter replacing the traditional manual approach which tends not to capture extreme events, such as storms or pollution spills unless samplers are unlikely to be in the field exactly when such events occur. Moreover, occasional field sampling cannot characterize higher-frequency aquatic processes, such as the diurnal oscillations of pH, dissolved oxygen, and conductivity that can result from biological activity or temperature.

On the other hand, aquatic monitoring sensors can often produce data that may not be representative of actual conditions. For example, optical (turbidity) sensors are prone to record unrealistically high values due to bubble disturbances, wiper brush positioning, or biological fouling of the sensor window. Sensors such as pH and dissolved oxygen can be miscalibrated, or if damaged can begin to drift as the control solution becomes contaminated with ambient water. Water level sensors can produce spurious data if the sensor float becomes jammed due to frazil ice or if pressure transducers are improperly calibrated, deployed, or subject to large temperature oscillations. Even solid-state sensors, such as thermistors, can record non representative values when exposed to air during low flow periods.

Additionally datasets that are produced by automated sensors are much larger than traditional manual grab sampling datasets. A weekly grab sampling program would produce 52 data points per year whereas a automated sensor recording every 15 minutes would collect nearly double that in a single day. Tools used to analyze traditional water quality data such as MS Excel are ill suited to the large datasets produced by data loggers. Excel is limited to plotted 32 thousand data points (1 year of 15 minute data), and cannot hold more than 64 thousand data points in a single column. Viewing more than a few years worth of data becomes impractical quickly. Furthermore validation and correction to time series datasets in tools such as Excel is hugely inefficient.

Recognising this problem a number of software tools have been produced to aid the hydrologist in the various tasks of organizing, summarizing, analyzing and validating masses of this data. This data can be time series data, discrete sample data or a combination. A number of these tools are freely available at the United States Geological Services (USGS) website http://water.usgs.gov/software/surface_water.html.

Hydrologists and environmental scientists face unique problems with respect to the data that they have to work on. The data collected is generally from disparate, physically isolated sensors and because of cost constraints there is little redundancy in the data collected to aid in verifying the validity of the data. Unlike in most engineering or scientific research fields, such as in a laboratory or process plant where the data sensors can be easily verified or re-measured, environmental scientists have to make do with data instead of just throwing it out or using data from redundant sensors.

Accordingly the environmental scientist and hydrologists must employ a myriad of different mathematical techniques for validating and correcting data. As a result a large assortment of different software tools are available data validity checking and correction. Often a number of different tools are required to be used in a variety of sequences or process steps. Again the USGS website provides a list of many such tools.

For example, data validation tools are used to estimate point-by point data uncertainty in time series data, since a series of data points over time (time series data) are only useful if they reflect true conditions, it is necessary to assess the reliability of the time series data. Data flagging tools are used for identification of questionable data. Data correction tools are used for removing outliers or non physical data values or to correct for fouling or sensor drift or interpolate sections of missing data.

Modeling tools may use rating curves, which express a relationship between stage and discharge at a cross section of a river. In most cases, data from stream gauges are collected as stage data. In order to model the streams and rivers, the data needs to be expressed as stream flow using rating tables. Conversely, the output from a hydrologic model is a flow, which can then be expressed as stage for dissemination to the public.

It is time consuming to arrange the order of processes, to include or exclude processes, and to ensure data compatibility and quality between steps. For example in a peak flow determination exercise if simulated peak flows differed from observed peak flows, this may be due to an error in the data and a new process step involving data correction may have to be included. A solution is proposed in U.S. Pat. No. 6,889,141 which teaches a method and system consisting of several independent automatic steps, wherein one step's result can be linked as the input of other steps through spreadsheets or text files to form a seamless stream of calculation. However this system is still limited in that it restricts the user to a rigid sequence of predetermined process steps and does not allow user the flexibility of graphically constructing and editing their own sequence of process steps.

Accordingly there is a need for an integrated hydrological system which offers to hydrologists and environmental scientists a convenient computer based environment for the entire hydrological data management process, starting with a data stream from telemetry equipment and data processing with the time series management, and reporting.

There is also a need for a system and method that significantly reduces the time required to organize, validate, correct, and plot hydrometric and water quality data.

There is also a need for a system and method that allows for easy statistical analysis, reporting, data grading, and modeling of this data.

The is a still further need for an environment that simplifies the management and analysis of water quality, hydrology, and climate time-series data by allowing users to define their entire data processing workflow in a highly intuitive and graphical workspace.

SUMMARY OF THE INVENTION

Accordingly the present invention seeks to provide a solution to the problem of providing an environment for the myriad of hydrology and environmental science software tools to be used by hydrologists and environmental scientists in controlling the processing of hydrological data.

An advantage of the present invention is to provide a "block and wire diagram" (whiteboard environment) for visualization and manipulation of hydrological data processing, by allowing a user to place one or more icons representing a process onto the whiteboard and further allowing the user to create visual connections between these icons, the visual connection representing data flow between the processes represented by the icons, thereby providing increased efficiency and simplicity for users when creating a process for managing, manipulating or modelling environmental data.

In accordance with this invention there is provided a computer-based graphical user interface for graphically controlling processing of hydrological data, comprising:

a display menu interface listing executable tools from the group comprising one or more of: hydrological data input, hydrological data validity checking and correction, and hydrological modeling;

a GUI for selecting and arranging tools from the display menu in a graphical display area to construct a hydrological process, the selected tools each being represented by icons on the graphical display, and for establishing a connection between at least one output of a first tool and an input of a second tool said tools by graphically displaying the connection between said tools representative icon; and input means for receiving user input to arrange and execute said constructed hydrological data processing process.

In accordance with a further embodiment of this invention there is provided a computer-based method for graphically constructing a hydrological processes, comprising the steps of:

listing on a display menu interface executable tools from the group comprising one or more of: hydrological data input, hydrological data validity checking and correction and hydrological modeling;

selecting and arranging tools from said display menu on a graphical display to construct the hydrological process, the selected tools each being represented by icons on the graphical display and establishing a connection between at least one output of a first tool and an input of a second tool, by graphically displaying the connection between the tools representative icon; and receiving user input to execute the constructed hydrological process.

BRIEF DESCRIPTION OF THE DRAWINGS

The present invention will be further understood from the following detailed description with reference to the drawings in which.

DETAILED DESCRIPTION OF THE PREFERRED EMBODIMENTS

Figure 1:
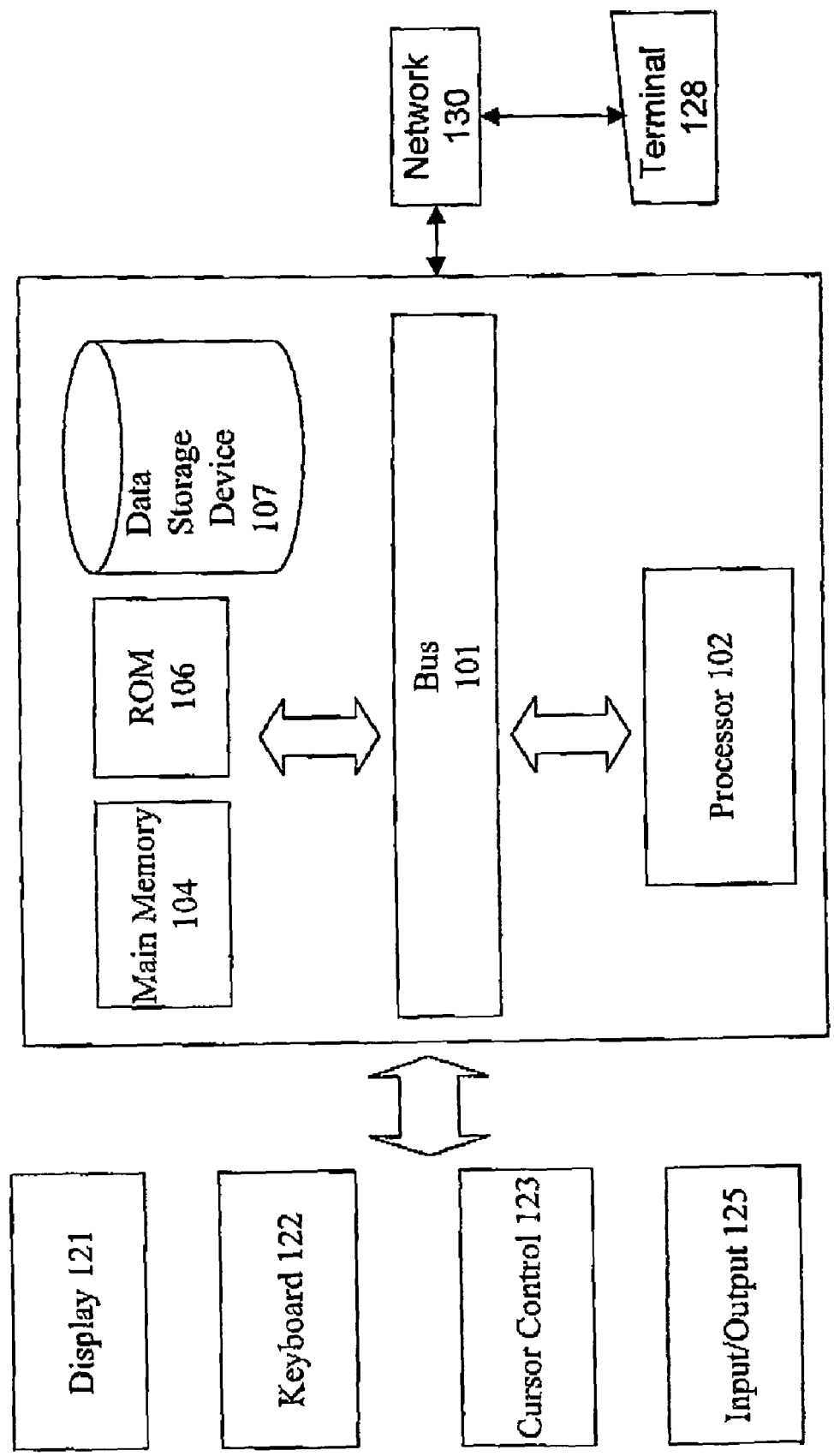
FIG. 1 is a block diagram of a computer system providing operating environment for an exemplary embodiment of the present invention.

In the following description like numerals refer to like structures in the drawings.

Referring to FIG. 1 there is shown a preferred computer system for implementing a hydrological data processing system 100 according to an embodiment of the present invention. The computer system 100 comprises a machine-readable medium to contain instructions that, when executed, cause a machine to display graphical user interface used to develop hydrological analysis processes as described below. Other instructions may cause a machine to perform any of the methods below. The system 100 may comprise a bus or other communication means 101 for communicating information, and a processing means such as processor 102 coupled with bus 101 for processing information. The system 100 further comprises a random access memory (RAM) or other dynamically generated storage device 104 (referred to as main memory), coupled to bus 101 for storing information and instructions to be executed by processor 102. Main memory 104 also may be used for storing temporary variables or other intermediate information during execution of instructions by processor 102. The system 100 also comprises a read only memory (ROM) and/or other static storage device 106 coupled to bus 101 for storing static information and instructions for processor 102. A data storage device 107 such as a magnetic disk or optical disk and its corresponding drive may also be coupled to with the system 100 for storing information and instructions. A display device 121 is coupled via a the bus, for displaying information to an end user. Typically, an alphanumeric input device (keyboard) 122, may be coupled to bus 101 for communicating information and/or command selections to processor 102. Another type of user input device is cursor control 123, such as a mouse, a trackball, or cursor direction keys for communicating direction information and command selections to processor 102 and for controlling cursor movement on display 121. Some embodiments may have detachable interfaces such as display 121 a touch screen, keyboard 122, cursor control device 123, and input/output device 122 or may only use a portion of the detachable devices. An input/output device 125 is also coupled to bus 101. The input/output device 125 may include interrupts, ports, modem, a network interface card, or other well-known interface devices, such as those used for coupling to Ethernet, token ring, or other types of physical, wireless, and infrared or other electromagnetic mediums for purposes of providing a communication link. In this manner, the system 100 may be networked with a number of clients, servers, or other information devices. The system may also be accessed by a terminal 128 via a network 130. Furthermore, the input/output device 125 may be coupled to one or more sensors to measure features of a test fluid. In an aquatic monitoring system, example sensors may include optical turbidity sensors, pH sensors, dissolved oxygen sensors, water level sensors, temperature sensors, solid-state sensors (thermistor), etc. The information or data provided by the sensors may be metadata, or other information derived from a data set, and is not limited to the data itself.

The following is a general discussion of the processes that a hydrologist and environmental scientists face with respect to data analysis and will prove helpful for the subsequent description of an exemplary embodiment of the present invention.

As mentioned earlier hydrologists work primarily with water quality data, hydrology data and climate time-series data. For convenience we refer to this collectively as hydrological data. [NTD: Pete if possible need an example of typical task or workflow].

The final product of hydraulic and hydrology calculation are [NTD: Pete can you fill in]

Figure 2:
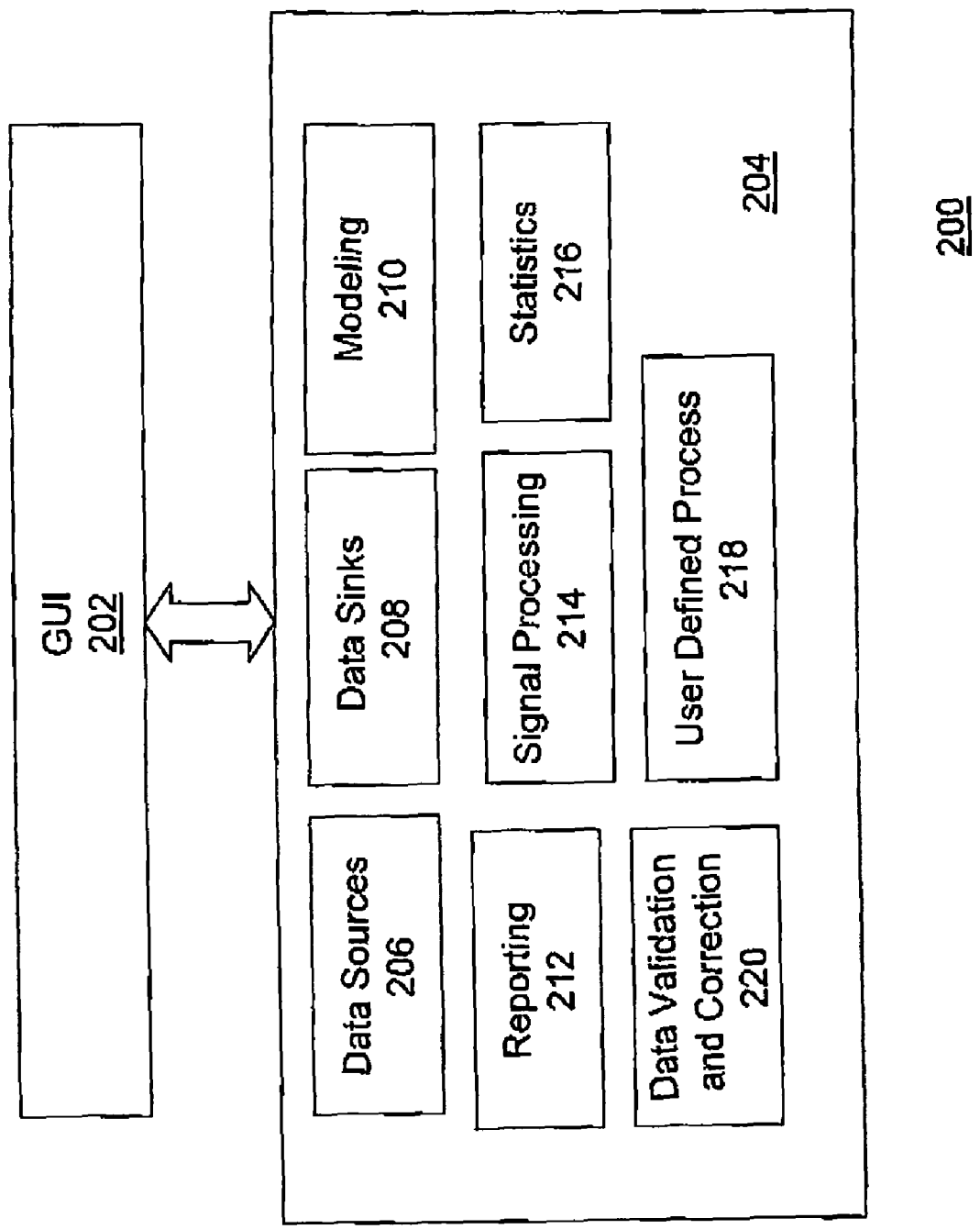
FIG. 2 is a schematic diagram of the software modules according to an embodiment of the present system.

Referring now to FIG. 2 there is shown a schematic block diagram 200 of the software program modules for hydrological data analysis, according to an embodiment of the present invention. The software modules 200 operate together to create an integrated hydrological analysis environment termed a white board which simplifies the management and analysis of water quality, hydrology, and climate time-series data by allowing users to define their entire data processing workflow in a highly intuitive, graphical workspace environment. The software modules 200 are composed of two main components, a graphical user interface 202 for generating a visual whiteboard display, accepting user input and coordinating and managing data flow between a collection of toolbox program modules 204. In the illustrated embodiment the collection of toolbox modules 204 comprise eight groups of tool box programs. The toolbox program associated with each group perform similar hydrological functions, namely: data source toolboxes 206, data sink toolboxes 208, data modeling 210, data reporting 212, signal processing 214, statistical analysis 216, data validation and correction 220 and user defined processes 218. Each toolbox comprise an executable program having it's own GUI, the program is represented by visual icons which may be placed on the whiteboard generated by the GUI module 202. The icons can be can be manipulated on the whiteboard by users to form a seamless stream of calculation for the underlying toolbox module functions. They can be combined in different order, combined partially, and the user can even use just one single function. The toolboxes may be combined in a manner to be described below for establishing complex workflows for processing hydrological data. The functions performed by the toolbox 204 may be executed by clicking on the corresponding icon which in turn displays the appropriate GUI for that function. Thus, for example, a signal processing function may be represented by a specific icon, while a statistics function may be represented by another icon. Each toolbox module also includes a set of attributes, which specify the number and type of data input and data output ports of the module. The icons provide a convenient graphical representation, which may be moved on the display screen of the GUI in order to construct a variety of models and hydrological processes. The icons provide the user with a method for selecting input data types for the modules and for direction of the subsequent output. The system provides the ability to execute simultaneously on independent sets of generated processes as well as to run selected modules independently by use multiple threads and processors.

The operation and functions of the toolboxes contained in these modules 204 will be explained in more detail below with reference to the screen display for each toolbox.

Figure 3:
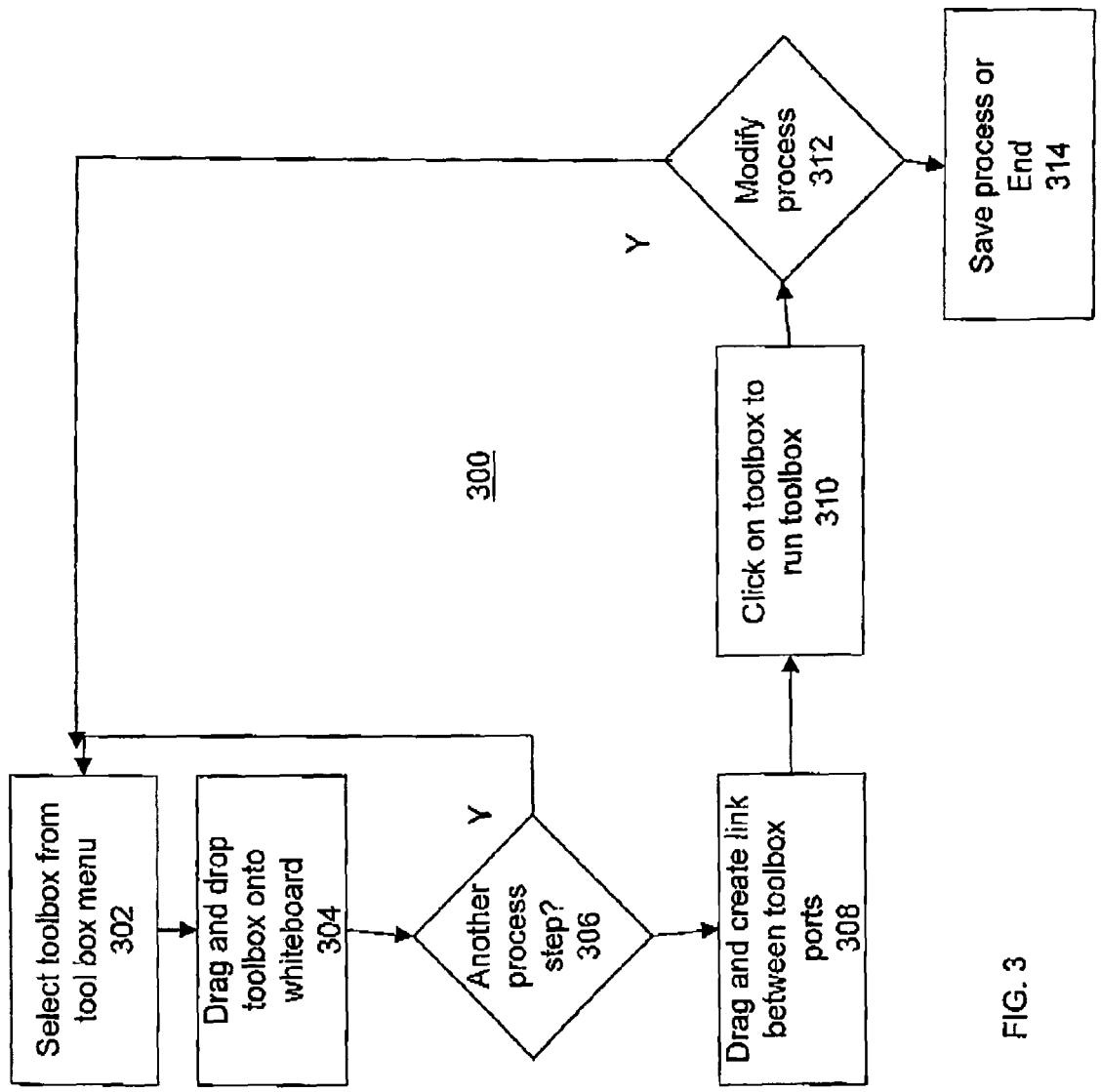
FIG. 3 is a process flow for using the system according to an embodiment of the invention.

Referring to FIG. 3 there is shown a workflow 300 performed by an expert who wants to perform hydrological data analysis or construct a hydrological data analysis process according to an embodiment of the present invention. The user selects from the GUI a toolbox 302 for the first step in the process and drags and drops the selected toolbox onto the whiteboard. If the user wishes to add another step to the process another toolbox is selected and dropped onto the whiteboard. The user continues for each step in the process The user can then click on the toolbox icon on the whiteboard to configure the input and output data ports of the toolbox (as will be explained later), links can be created between the toolboxes to complete the data flow between each step in the constructed process. The user can click on the icon of a selected process and perform the functions of that toolbox. The user can then choose to run the process. Additional process steps may be added or the constructed process may be saved as new compound process and assigned to a new toolbox icon. This new toolbox may then be subsequently used as a step in another process, without the user having to recreate its process steps.

Figure 4:
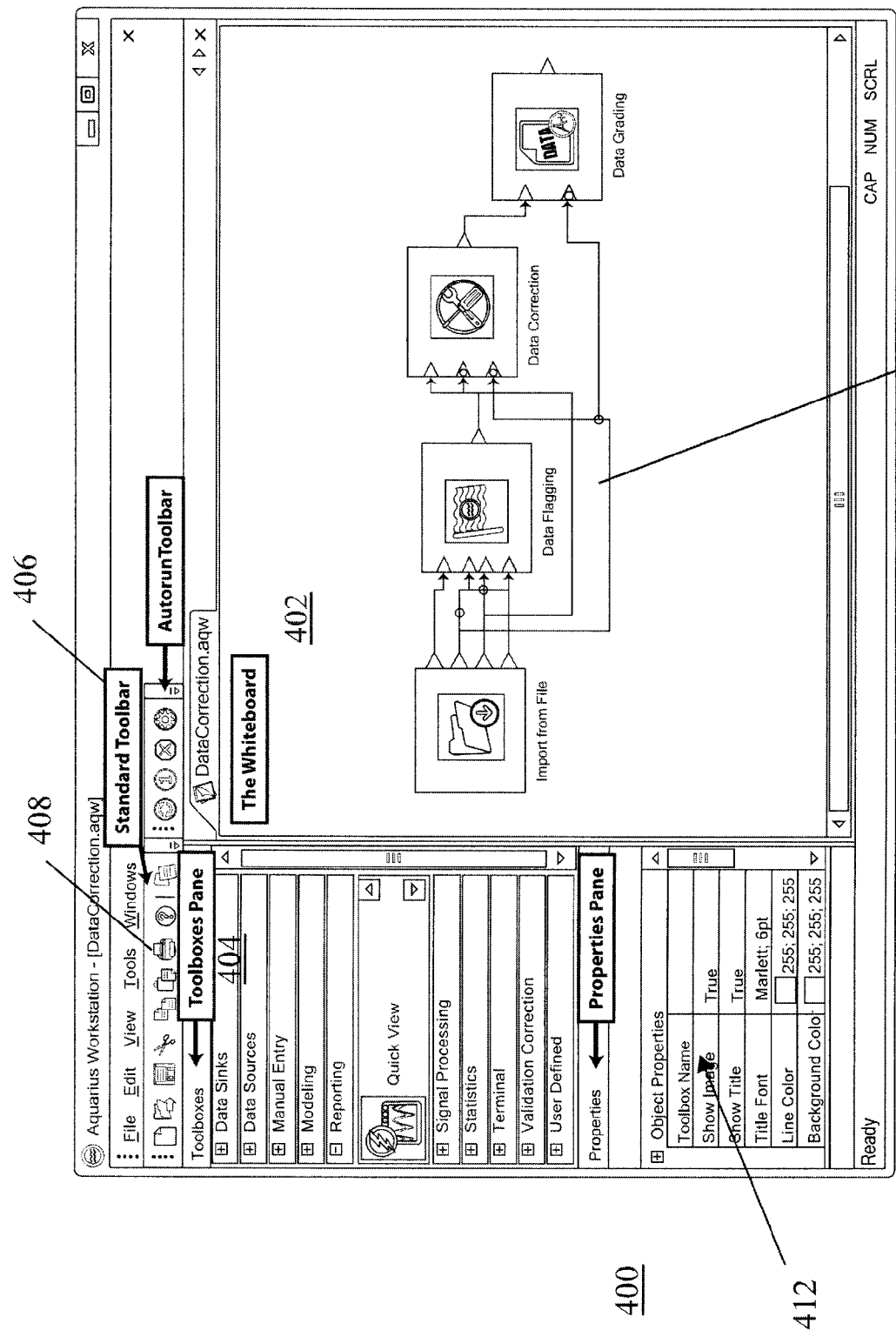
FIG. 4 is screen display of a whiteboard according to an embodiment of the invention.

Referring now to FIG. 4, these is shown a screen display 400 of a preferred embodiment of the GUI 202. The screen display 400 includes two main areas a whiteboard window 402 and a toolbox window 404. In addition to these two primary areas, the screen display 400 includes standard 406 and autorun 404 toolbars along with a properties pane to further configure and manage workflow and toolboxes. The whiteboard allows users to drag and drop toolbox icons contained in the toolbox window 304 and configure them into simple or complex workflows 310. In the embodiment shown an import from file icon is coupled to a data flagging icon which in turn is coupled to a data correction icon which outputs to a data grading icon. The coupling or data flow and type between the icons is shown by the user attaching connection lines between the appropriate input and output ports of the icons. As each of these icons represent the underlying toolbox function, the GUI automatically ensures that that appropriate data types are passed to the underlying functions as represented by the connection lines. The whiteboard environment easily allow users to develop hydrological processes without requiring them to delve deep into menus or cascading toolbars to perform complex or simple tasks. In addition multiple Whiteboards can be worked on at the same time. Each Whiteboard that is currently open is represented by a tab at the top of the whiteboard pane. Toolboxes can be moved onto the Whiteboard by clicking and dragging them into the desired location on the Whiteboard.

Figure 5:
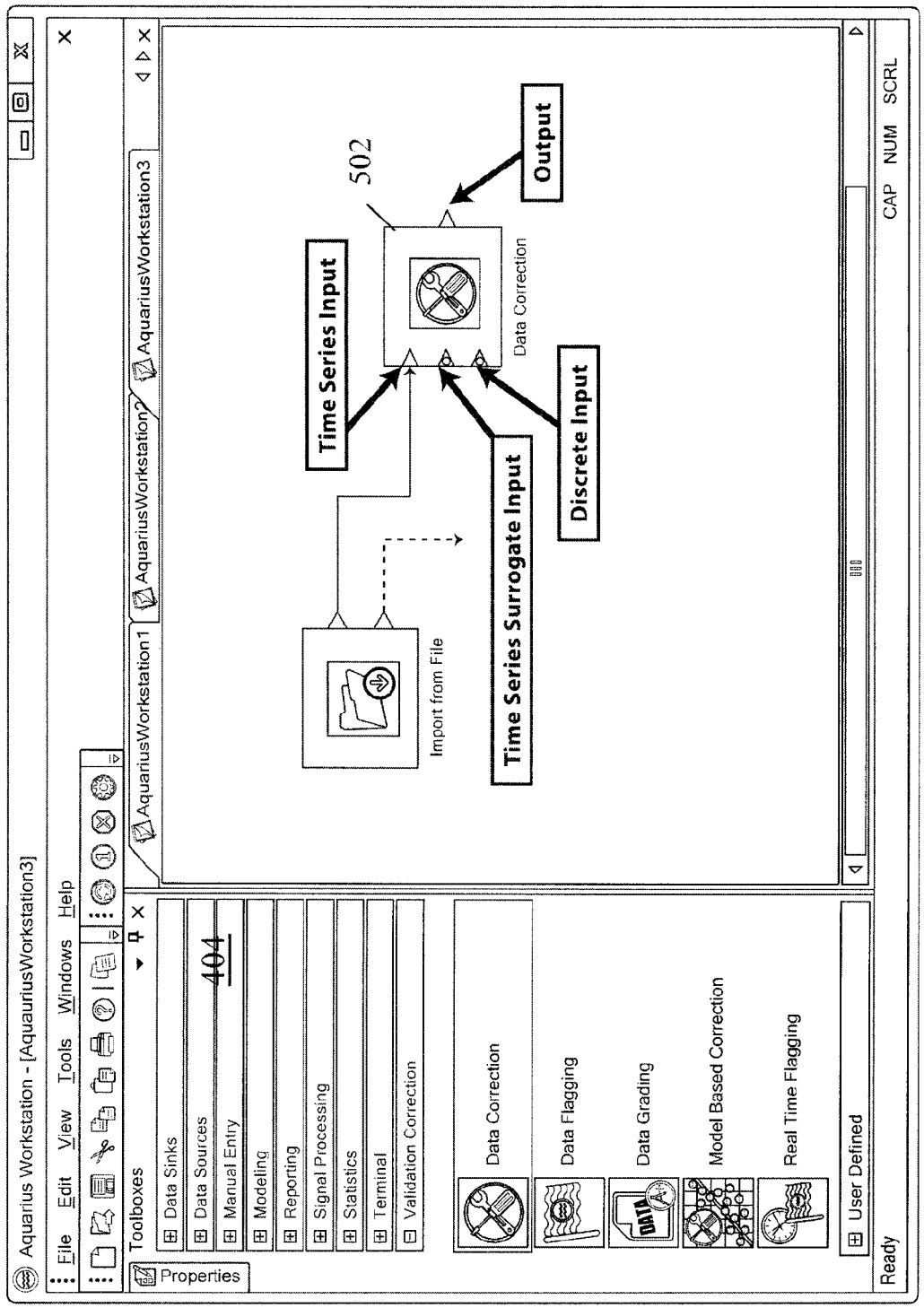
FIG. 5 is screen display showing input and output ports on a toolbox.

As mentioned earlier toolboxes may have different inputs and outputs depending on the specific toolbox's functionality as shown in FIG. 5. For example, the data correction toolbox 502 has three inputs ports as well as one output port. A first (top connector) for time series data, a second connector is an optional time series data input port for surrogate data, a third optional port is for connecting discrete samples data and an output port for the corrected time series data.

Figure 6:
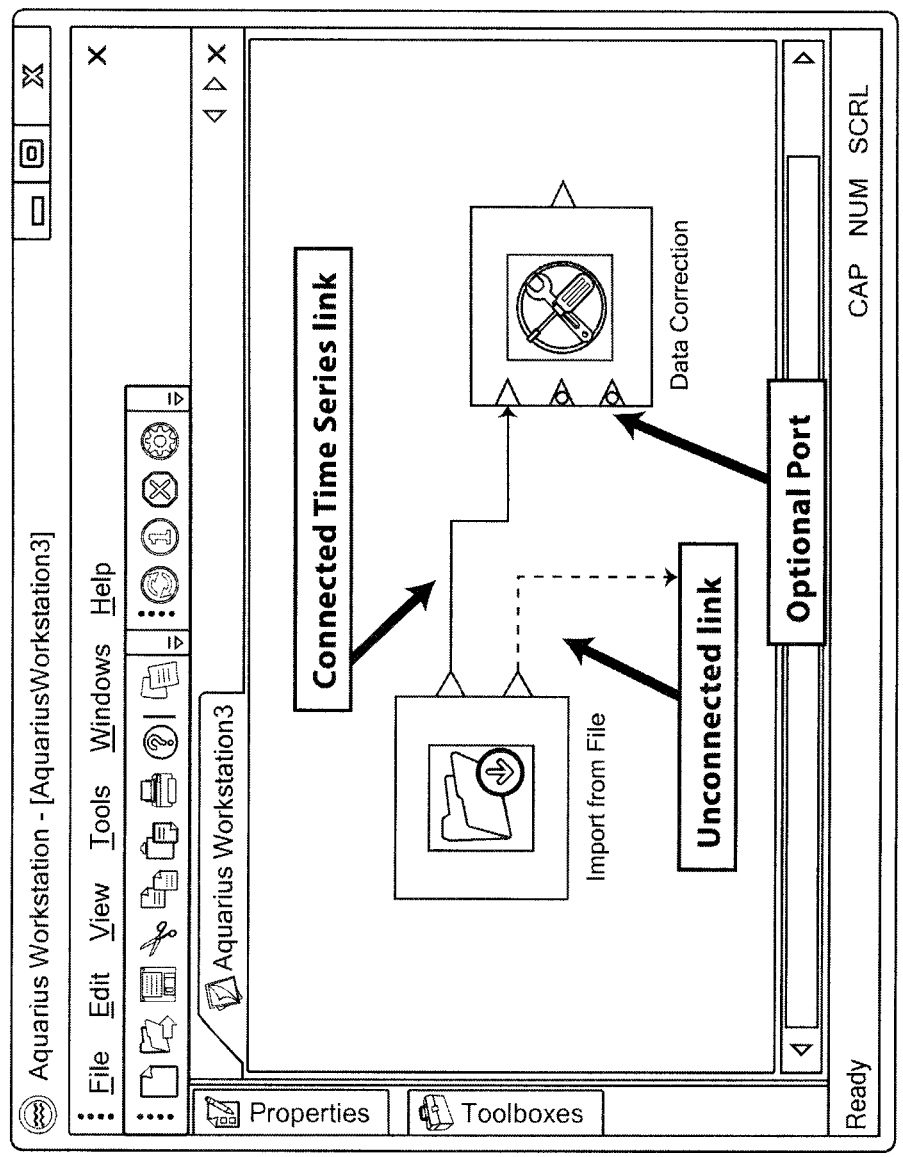
FIG. 6 is a screen display showing different visual attributes for different data types and links.

An important feature of the present whiteboard environment is that the icons that represent the toolboxes include visual attributes to distinguish between the underlying toolbox links and ports. In a preferred embodiment as shown in FIG. 6 the links and ports are color coded for the type of data which they carry. By default time series links and ports are a first colour (e.g. olive green), and discrete samples links and ports are another color (e.g. Orange). Links that are not connected are dotted in a unique color (e.g. dotted red). An unconnected link can be extended by clicking on its arrow end and continuing to drag the link to the desired port. This two step process of first creating an unconnected link and then redirecting the link to a port is a useful technique for keeping links from overlapping. For example a user can click and drag to create a link and unclick to intentionally leave it as an unconnected link on the Whiteboard. In this way the user can choose to route the link around any pre-existing links. The user can then click and drag the unconnected link in the different and new direction to complete the link and attach it to a port. Some toolboxes have optional input ports. These toolboxes can be run without a link connecting data into these ports. Ports that are optional have a small 'o' inside the input port triangle.

The Autorun toolbar 406 contains the tools used for automatically running a process constructed on the whiteboard. The Autorun toolbar 406 contains the icons for run Loop, run Once, Stop, and Autorun Setup. The Autorun toolbar 406 can be moved, floated, or docked by clicking and dragging the dotted handle on the left edge of the toolbar. For whiteboards to be autorun they must consist of only toolboxes that have realtime functionality (e.g. Import from DB, Signal Trimming, Reporting) and must not have any toolboxes that require user input (e.g. Data Correction). The autorun setup function brings up a pop-up window where the user can set the autorun properties. A trigger period can be entered as a number of second between whiteboard runs. Additionally the whiteboard can be can be set to run in a loop starting at the start date and time and finishing at the end date and time. Once a whiteboard has been started and scheduled it will run through to completion.

The Properties Pane 412 displays information about the currently selected toolbox and lets the user specify various attributes about the toolbox such as: Name/Title, Image, Size, Color, Font, Number of Inputs/Output.

One of the activities performed by a user is to chart a data set. Accordingly the whiteboard environment allows charting properties to be set. The charting properties of the active chart can be accessed through the Charting Properties button in the main toolbar at the top of these toolbox windows: Signal Joining, Quick View, Data Correction, and Data Grading. An advantage of the present invention is its charting functions. A great deal of work can go into making a chart look just right having the fonts and tick marks setup perfectly for a specific type or report can often take more time than building the initial chart itself. To this end the present invention provides the ability to save a set of charting parameters so that any subsequent chart development can use the exact same settings that were used initially.

The data sink toolbox 206 provides two ways to output data from the whiteboard. These are export to Database for exporting to an external database via an ODBC driver or export to File which exports data to a flat text file such as a .csv file. An advantage of the data export toolboxes is that it allows database administrators and users to define a configuration of data mappings that will allow users to simplify their data export. This will remove the need for non-administrators to ever have to write SQL queries or connect and configure data sources names (DSNs). In a preferred embodiment no configuration information is passed from the Import from DB toolbox to the Export to DB toolbox as the two toolboxes are treated completely independent of each other. This simply means that the configuration must be specified in both the Import and Export DB toolboxes. This gives users the maximum flexibility when using the system as they may be importing and exporting from two different databases. The Export to File toolbox can be used to export any data type from the Whiteboard to a file for use outside of the whiteboard. There are various output file formats depending on the data type that is passed into the Export to File toolbox. The Export to File toolbox has one, black colored, input port that can accept any data type. Users can specify the number of input ports within the properties pane. The Export to File toolbox can be run either by double clicking on the toolbox icon on the Whiteboard or by right clicking and selecting Run from the right click menu. Most of the functionality in the Export to File toolbox is used to create flat files, text or .csv, out of time series data.

As mentioned earlier the data source toolbox module 208 includes toolboxes for importing from a Data Portal, a database, a file, GOES satellite telemetry system or directly from sensor communication. The import from data portal toolbox allows users to access and download historical and real time USGS and Environment Canada data. The import from database toolbox allows importing of data from external databases with an ODBC driver. This allows users to import data directly from an existing database. The import from file toolbox is used to import data from ASCII or text based files. The sensor communication toolbox allows users to connect directly to sensors for downloading of data and programming.

The import from database toolbox allows database administrators and users to define any number of "canned yet configurable queries" which, the regular users of the system can use to access their data. This will remove the need for non-administrators to ever have to write SQL queries or connect and configure data sources names (DSNs). For example, a water quality technician may want to query their organization's time series database for some pH data. They would need to somehow tell the system and the database how to find this data, perhaps by giving a SiteID for the station they are interested in and a parameter code for pH. However, almost every agency will have different business rules and methods of storing and organizing their data; some databases are highly normalized, others are relatively flat. The Import from DB toolbox is highly configurable to handle this wide range of different data storage structures.

The Import from File toolbox allows for importing of time series (continuous data logger data) and discrete samples data (grab sample or portable field meter data) onto the whiteboard from flat files (*.csv or *.txt), XML files.

The Sensor Communication toolbox allows for direct communication between the whiteboard and an environmental sensor hardware via a serial or USB port. Once properly configured and connected all of the sensors firmware menu functions are available via the terminal screen. This interface also has the added functionality of being able to download data directly from the sensor's data logger. For this communication to take place your sensor must be directly connected to a PC or laptop by a serial/RS-232 cable or a compatible USB cable. The Sensor Communication toolbox can be run after it has been dragged onto the Whiteboard by double clicking on the toolbox icon or by selecting Run from the right click context menu.

The Data Entry toolbox is used for manual data entry of datasets. Typically data logger or time series data would not be entered in this manner; however portable field meter, grab sample, or stage vs. discharge point pair data may be entered in this way. The toolbox has one optional input port that will accept stage discharge point pair, time series, or discrete samples data. The toolbox can be run either by double clicking on the toolbox icon once it has been dragged out onto the Whiteboard by selecting Run from the right click context menu. If no data is plugged into the input port, the toolbox will prompt the user to select the type of data they want to manually enter. There are three data types that can be manual entered: Times Series Data Entry, Discrete Sample Data Entry and Rating Measurement Set Entry.

Figures 7A, 7B:
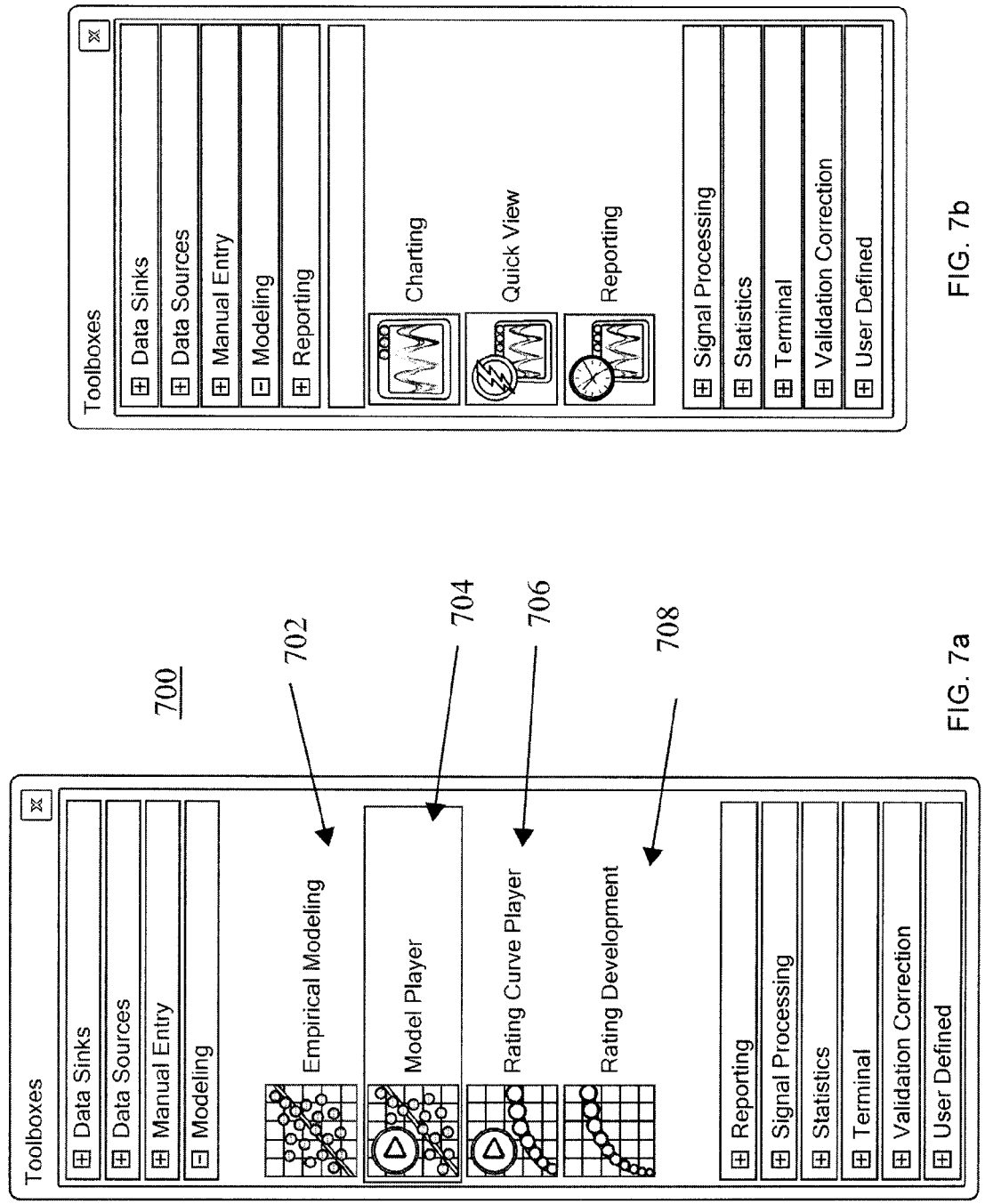
FIGS. 7a and 7b show screen shots of a modeling and reporting modules.

There are four modeling toolboxes 700 as shown in FIG. 7a within the modeling toolbox module 210 for both hydraulic and empirical modeling: Empirical Modeling Model Player, Rating Curve Player, Rating Curve development The Empirical Modeling toolbox 702 is the environment where time series models can be built in an intuitive point and click manner. The Empirical Modeling toolbox 702 has one target time series input. This input represents the time series data for which we are building the model. The target time series will be the goal in model optimization. There are 1 to 6 surrogate signal inputs. Surrogate signals represent the inputs to the model. The number of input ports can be changed in the properties pane by first selecting the port and then entering the desired number. Additionally there are two optional input ports, one for discrete sample data, and one for previously developed models. The number of toolbox outputs depends on the number of models developed within the toolbox session. The different models include linear regression, dynamic modeling and artificial neural modeling.

The Model Player Toolbox 704 is used to generate synthesized time series data. The Model Player Toolbox supports all three of the modeling types supported within the Empirical Modeling Toolbox: Regression based modeling, Dynamic Modeling or Autoregressive Moving Average Processes modeling (ARMA) Non-linear Artificial Neural modeling (ANFIS). The Model Player has two inputs: One time series input (green) for the model time series input. The number of time series inputs can be changed in the toolbox properties pane since models may have many time series inputs. One model input (dark purple) for the model to be used within the toolbox. Before running the Model Player toolbox certain properties may be setup—these can be entered by double clicking on the toolbox icon. The synthesized signal output has three text boxes for description, units and sampling rate—each can be specified as required.

Additionally there is an option to use the raw or corrected versions of the surrogate (input) time series. The output signal can be calculated by right clicking on the toolbox icon and selecting run. When the computation is complete a time series output port appears on the toolbox icon and can be piped to other toolboxes.

The Rating Curve Player Toolbox 706 allows the application of a time series to a rating curve from the Rating Development Toolbox, or from the database. For example, with a stage vs. discharge rating curve and the appropriate time series of stage data, the Rating Curve Player Toolbox can generated the derived time series of discharge. The Rating Curve Player toolbox has two mandatory input ports: A time series input (green), A Rating Curve Input (red). The output port is computed after both input ports have been connected and the toolbox has been run by right clicking on the toolbox icon and selecting Run. The toolbox application properties of the Rating Curve Toolbox can be accessed by double clicking on the toolbox icon. The description and units of the output time series can be specified in the toolbox application properties. Additionally the rating curve can be applied to either the Raw or Corrected version of the input time series. If the input time series has not been passed through any correction toolboxes prior to the Rating Curve Player toolbox, this option has no effect.

The Rating Curve Development toolbox 708 allows quick and intuitive development of stage-discharge and other rating curves in a digital environment. The Rating Curve Development toolbox has one optional input for HYDROml input data. This input is optional and HYDROml or measurements files (CSVs) can be loaded from within the Rating Development Toolbox. To launch the Rating Curve Development Toolbox, double click the toolbox icon once it has been dragged onto the whiteboard.

Referring to FIG. 7b there is shown the Reporting toolboxes. A Charting toolbox is a comprehensive time series charting package for publication quality plots of time series data. The Quick View toolbox is useful tool for quickly viewing a chart of your time series and or discrete samples data. The Reporting Toolbox can be used to generate customized graphical (JPG, PNG, GIF, BMP) and tabular (HTML, CSV) output when run within the Whiteboard or as an automated process. The Reporting Toolbox accepts one to many input time series datasets. The number of inputs can be changed from the default one, in the Properties Pane of the toolbox. The properties pane is accessible via the right click context menu. The functionality of the reporting toolbox is present in the form of an autonomous toolbox similar to Signal Trimming, rather than an interactive toolbox such as Data Correction. Autonomous toolboxes can be setup in their respective properties dialogs, and then run either in Real-Time Mode or by right clicking the toolbox icon and selecting Run. The properties dialog of the Reporting toolbox can be accessed either by double clicking on the toolbox icon, or by right clicking and selecting Properties (not Properties Pane) from the right click context menu.

Figure 8:
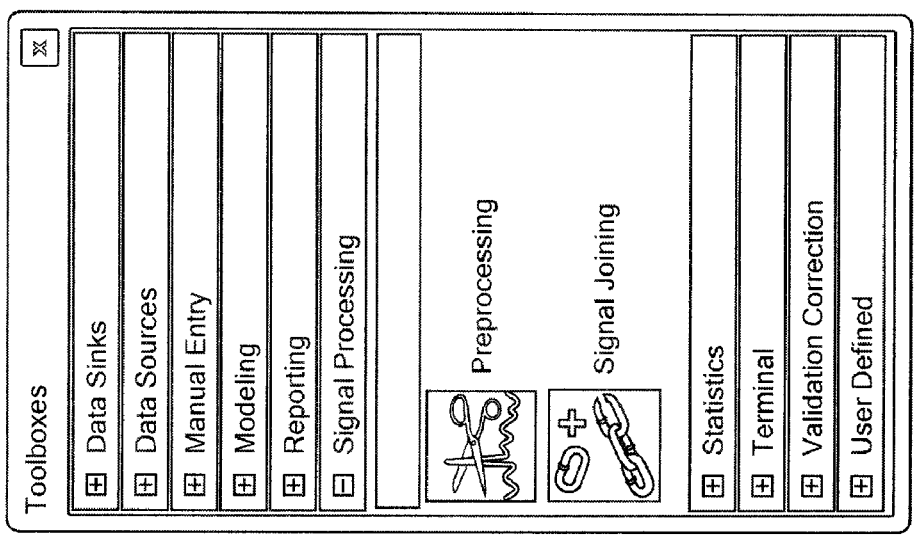
FIG. 8 is a screen display of the signal processing modules.

Referring to FIG. 8 there is shown the toolboxes for signal processing. These include several toolboxes for initial time series processing: Signal Trimming, Signal Joining. These can be found in the Signal Processing toolbox module 214. The signal trimming toolbox can be used to trim data outliers, periods of data records or can be used to reinterpolate time series to a different sampling interval (e.g. from 15-minute to hourly). The signal joining toolbox allows joining appending of two or more time series data files so that a complete record can be built. For example monthly data files can be joined to form yearly signals or longer. The Signal Trimming toolbox is a useful toolbox for running initial and often tedious tasks on a single time series dataset. The toolbox allows for simplified date and outlier trimming of a signal. There are additional tools within the Signal Trimming toolbox for re-interpolating a time series with a different sampling intervals and filling data gaps. The toolbox takes a single input time series and runs a series of processing steps which can be setup in the toolbox properties dialog. After connecting a time series signal to the toolbox, it can then be run by double clicking the toolbox or by selecting Run from the right click context menu. This tool also includes A Date Trim tool allows for trimming of a time series based on specified date range Outlier Trim tool allows for the trimming of values from a time series that fall outside of a specified upper and lower limit. The Replace a Value with a Gap option allows the user to specify the replacement of a specific value within a time series with a data gap. This tool can be helpful as quite often data loggers will record a value of 0 or −9999 when no data is present The Interpolate Small Gaps option gives users the ability to automatically interpolate across small gaps within a time series. Often with telemetry decoding or other regularly occurring errors a high frequency of small (one or two data point) gaps appear in a time series. This tool can be used to interpolate these small gaps using a linear or cubic spline function The Resample Signal feature allows users to resample a dataset up or down to a different sampling interval. The new sampling period can be specified as an integer number of minutes; the interpolation function can be selected as either linear (good for down sampling—going from 15 minute data to hourly data) or cubic spline (good for up sampling—going from 30 minute data to 10 minute data) The last selectable option allows the user to choose whether the above preprocessing steps are to be applied to the raw or the corrected version of the input time series.

As mentioned earlier the Signal Joining toolbox can be used to join or concatenate adjacent or overlapping sections of time series data. This toolbox can be extremely useful if you are downloading data from your sensors in the field during calibration and maintenance visits and want to join the recently downloaded data to the historical dataset from the same station. Instead of joining your data files in a text editor or Excel, using copy and paste, the Signal Joining toolbox provides a visual environment for joining time series. The Signal Joining toolbox has a minimum of two input ports available for connecting your time series data. The number of input ports can be increased to join large numbers of time series data segments. To add more ports, right click the toolbox and select Properties; the number of input ports can be increased from 2 to a maximum of 10. Once at least two time series have been connected to the toolbox, it can be run by either double clicking the toolbox or right clicking and selecting Run from the right click context menu.

The Statistics toolbox is a user friendly environment for quickly generating statistics from time series data. The Statistics toolbox has one to ten input time series ports. Most statistics require only a single time series, however, correlation analysis requires at least two time series. When the toolbox has been correctly wired up on the Whiteboard and run (either by double clicking the toolbox icon or by selecting Run from the right click menu), the statistics toolbox starts. The statistical functions available within the statistics toolbox are Descriptive Statistics, Mann-Kendall Statistics, Probability Plots, Exceedance Probability, Correlation Statistics and Auto-Correlation Statistics.

Figure 9A:
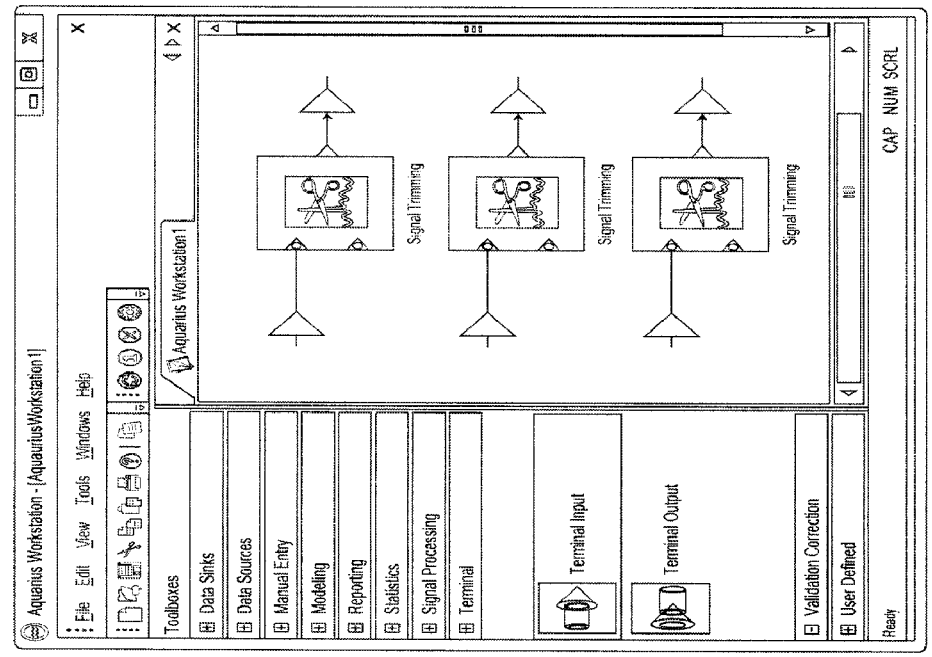
FIGS. 9a and 9b is as a screen display showing use of user defined terminal toolbox according to an embodiment of the present invention.
Figure 9B:
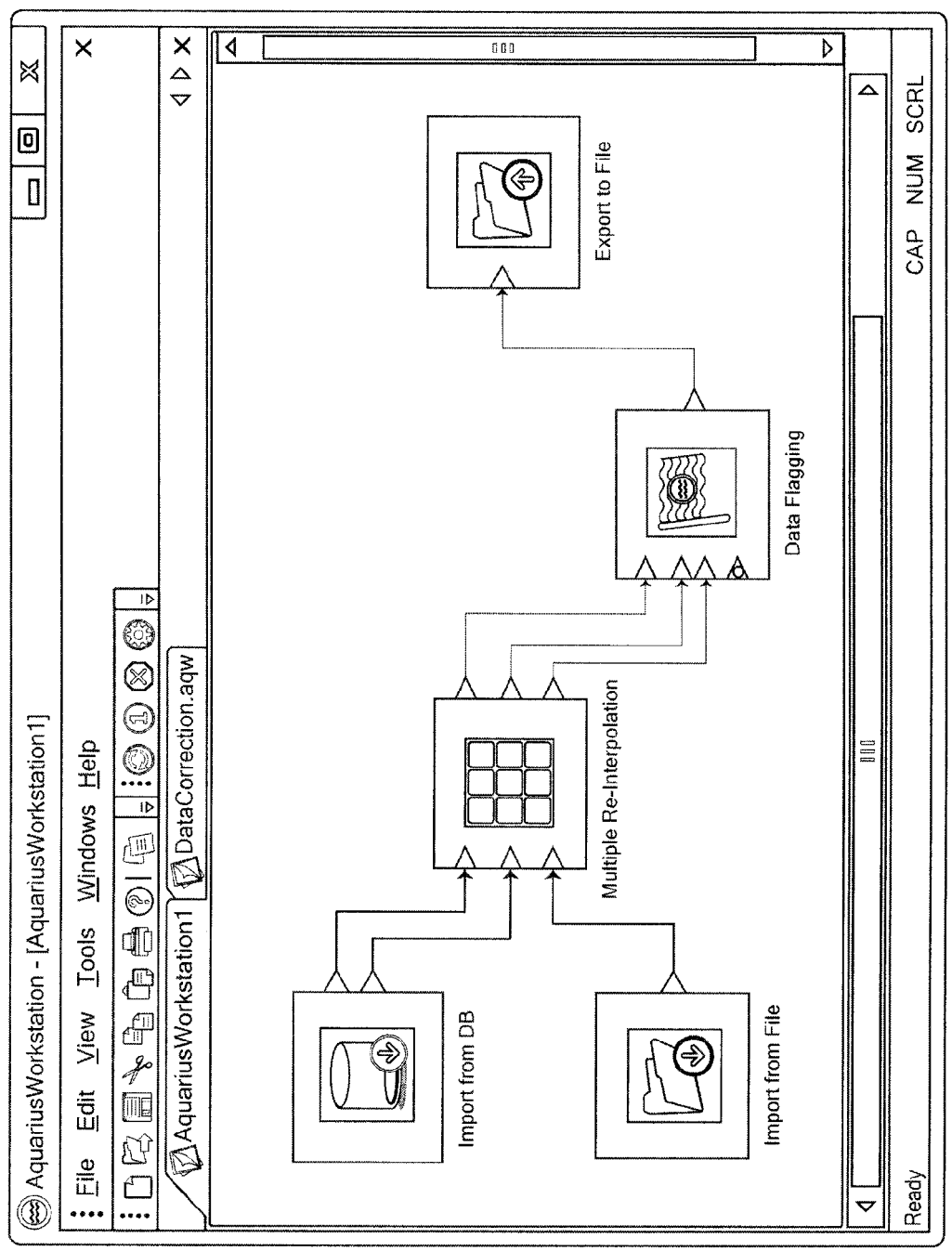

The terminals and user defined toolboxes module 218 allows user-defined toolboxes as shown in FIG. 9*a* (which shows the construction of a multi reinterpolation toolbox using the signal trimming toolbox), the use of terminals on the whiteboard allows definition of toolbox inputs and outputs once a whiteboard has been aggregated (using the function File->Save User Defined Toolbox As . . . ) down to a user-defined toolbox. Terminal inputs and outputs become the input and output ports of user-defined toolboxes. The data type, and whether the port should be optional, can be set in the properties pane of the terminal. The newly created toolbox can then be dragged onto the whiteboard for use with another process as shown in FIG. 9*b*.

Figure 10:
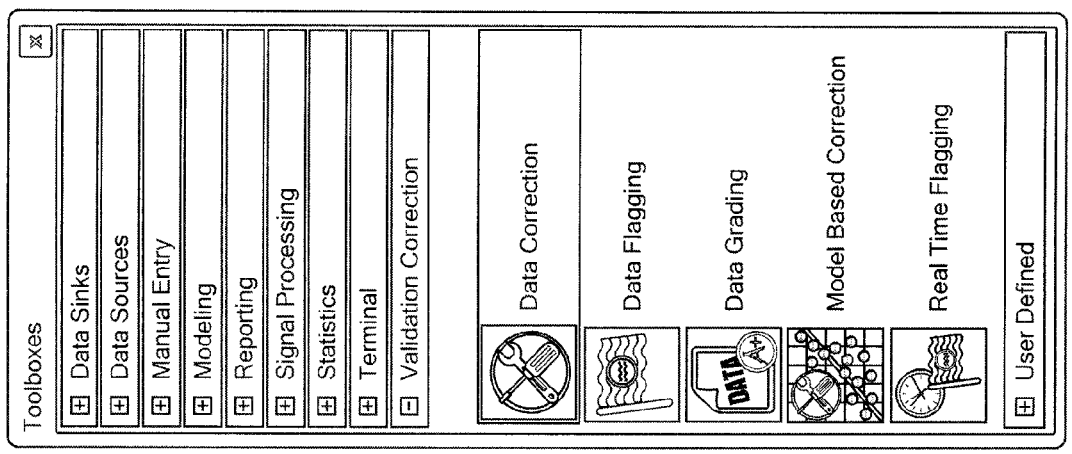
FIG. 10 is a screen display of the validation and correction modules.

Referring now to FIG. 10 there is shown the Validation and Correction toolboxes. These toolboxes include several toolboxes for validation and correction of time series data, namely a Data Correction toolbox which allows for manual adjustment of offset or bias, tools for removing sensor drift and interpolation tools to bridge short data gaps. A Data Flagging toolbox allows for automatic calculation or manually setting data flags to time series data. Data flags are used to mark areas where data is suspect and further evaluation is required. A Data Grading toolbox allows for manual assignment of data grades (data quality) for sections of time series. A Model Based Correction toolbox allows application of models to estimate missing or invalid data in a time series and to perform residual analysis and a Real Time Flagging toolbox is used to apply an automatic data flagging algorithm in real time.

Figure 11:
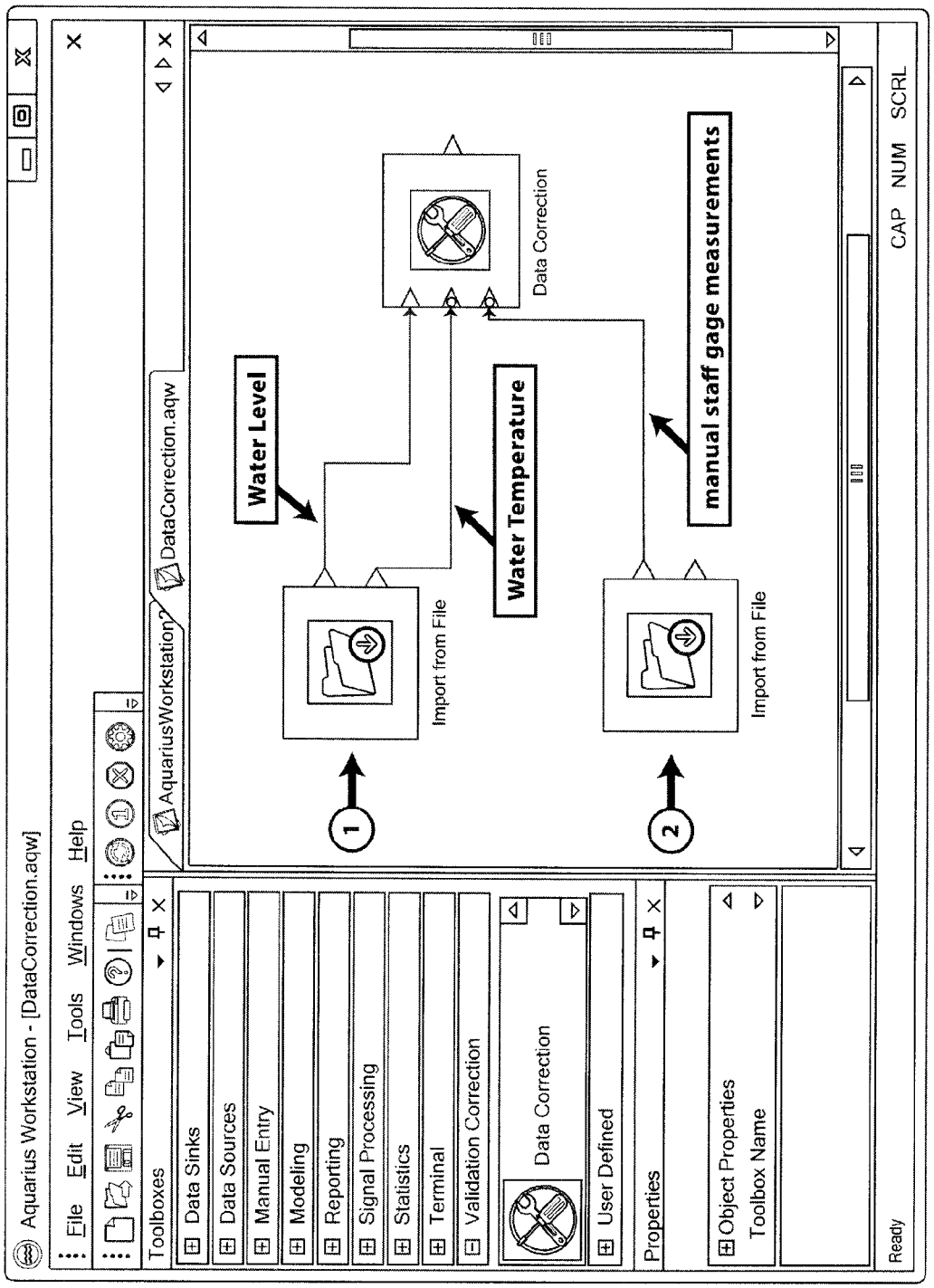
FIG. 11 is a screen display of constructed workflow for data correction.

Referring to FIG. 11 there is shown an example of a constructed workflow for common data corrections that are often necessary when working with hydrology time series data. As shown the whiteboard is constructed with two Import from File toolboxes and one Data Correction toolbox. The first Import from File toolbox is used to import a water level and water temperature time series: The water level time series has been plugged into the target input port of the Data Correction toolbox. The water temperature time series has been plugged into the surrogate input port of the Data Correction toolbox. The second Import from File toolbox has been used to import the water temperature and staff gage height levels collected by a group of "Stream Keepers," volunteers who visit the site every few days: The discrete samples of water level data (the "Stream Keepers" field data) has been plugged into the discrete samples port of the Data Correction toolbox. Next by Double clicking, or right-click on the Data Correction the Data Correction toolbox can be selected to run.

The Data Flagging toolbox is the toolbox is where data can be flagged for outliers, drift, mis-calibration, and other types of errors using surrogate time series data from nearby station or synthesized time series data by using the Empirical Modeling toolbox and the Model Player toolbox. The Data Flagging toolbox has three groups of input: The first (top) time series input is for the time series that is to be flagged. The second group of inputs are surrogate time series inputs. The toolbox supports 2 to 4 surrogate time series inputs. The number of input surrogate time series ports can be changed in the properties pane which can be shown or hidden from the view menu. In addition, there is an optional port for discrete sample data. Once the toolbox has been correctly wired up on the Whiteboard it can be run either by double clicking the toolbox icon or by right clicking the toolbox icon and selecting Run.

Automatic (parity space) data flagging can be performed by specifying percentile or magnitude ranges of a distribution of residual parity space vectors to specify various coloured flags (e.g. red>99%, orange>95% yellow>80% green<80%). A method for this parity space calculation was developed by Peter Hudson et al., and the subject of U.S. Provisional application No. 60/876,693 which is incorporated herein by reference.

The Data Grading toolbox can be used to assign data quality grades to sections of time series data. Since collection of environmental time series data requires the deployment of remote sensors, which are subject data quality issues such as, fouling, calibration drift, vandalism, and other damage; the data recorded may not always be of excellent quality. Even after a time series data set has been corrected using the Data Correction toolbox and or the Model Based Correction tools, data grade qualifying information may assist the public and other agencies in determining the appropriate use of the time series dataset. Data Grading toolbox has two input ports: One for the time series that is to be graded A second optional port for discrete samples data Plotting discrete samples data in addition to the in situ sensor data is useful for assignment of water quality data grades based on the disparity between continuous and ground truthing data. Once correctly wired up, the Data Grading toolbox can be run either by double clicking the toolbox or by selecting Run from the right click context menu.

The Model Based Correction Toolbox is the environment where models can be used to perform corrections on time series data. The Model Based Correction toolbox has four types on input ports and one time series output port: The First time series input port is the time series to which corrections are to be applied (the target signal). The second input port(s) is the surrogate time series data. There can be 1 to 6 surrogate time series. The number of surrogate time series ports can be changed in the toolbox properties pane which can be shown or hidden from the view menu or from the right click menu. The third input port (orange) is for discrete samples data and is optional. The fourth port is for models that have already been developed within the whiteboard. The models port is optional and can be increased in number to accommodate up to 10 models. Once the Model Based Correction toolbox has been wired up on the Whiteboard it can be run by double clicking on the toolbox icon or by right clicking and selecting Run.

The Real Time Flagging toolbox can be used to generate data flagging in real time as a Whiteboard is run either on a scheduler or in a loop. The Real Time Flagging toolbox has four groups of time series inputs: The first input is the real time target time series, which is the time series to be flagged. The second group of ports are real time surrogate time series. There can be 2 to 4 surrogate time series. The number of ports can be changed in the toolbox properties pane. The third group of ports is the optional historical target signal. The automatic flagging routing provides better results with larger datasets, as using this historical target data in conjunction with historical surrogate data (the fourth port group) can help generate better data flagging results.

Figure 12:
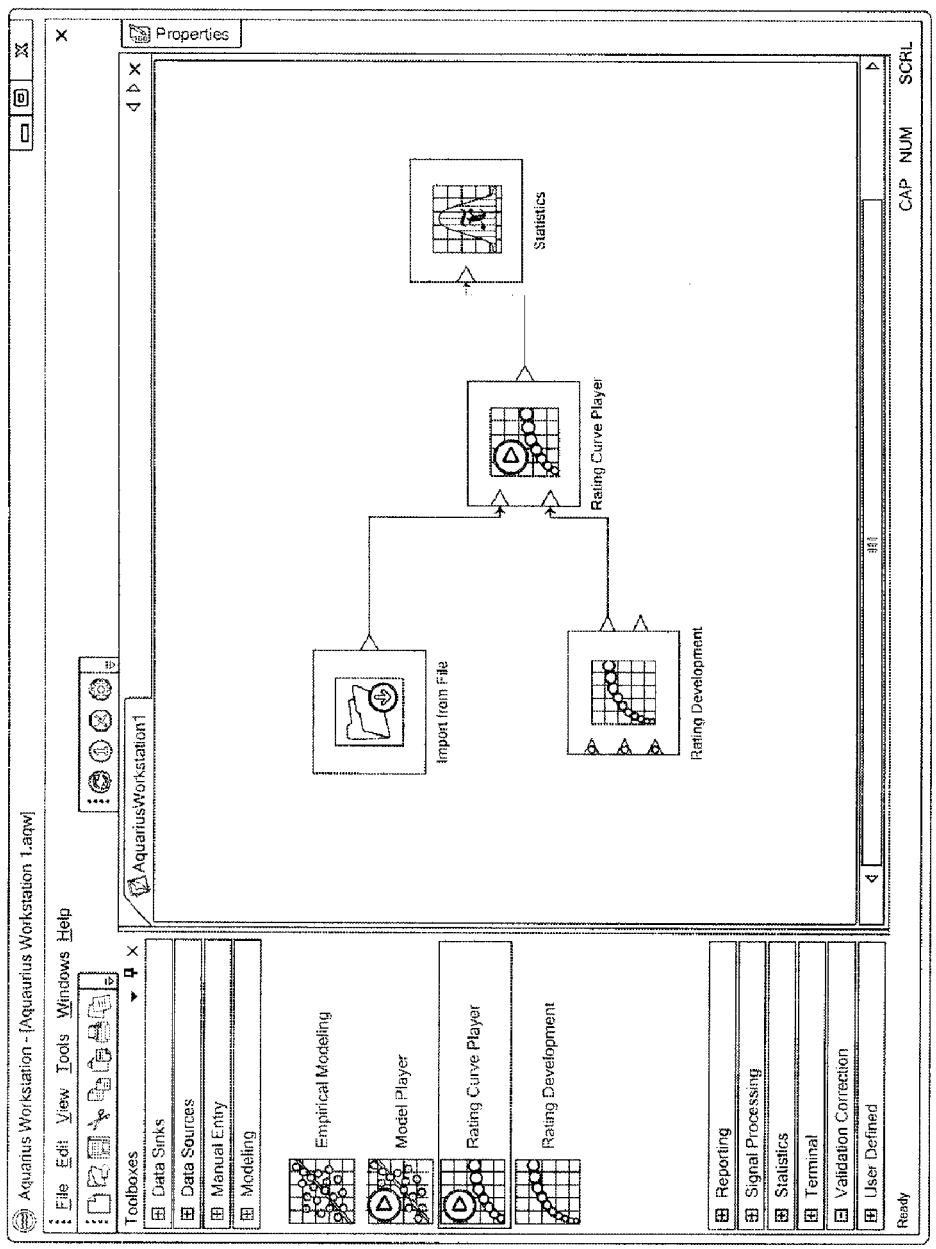
FIG. 12 is a screen display of a use of the whiteboard according to an embodiment of the invention.

Referring now to FIG. 12 there is shown a screen display of process constructed using the whiteboard of the present invention. As may be seen, the rating development application has been run and the user has created a rating curve (red wire) and has also run the Import from File application creating a Time Series data set (the green wire). These have been wired to the Rating Curve Player toolbox which has not yet been run and as such the wire connected to its output is 'skinny' meaning there is no data yet available. However once it has been run by the user the data will then be available for the Statistics toolbox to run.

In summary, the present invention provides a visual interface for developing process for managing, validating, correcting, visualizing, modeling, reporting, and analyzing continuous environmental time series data. Typically; that is data which are generated by one or more automatic sensors every several seconds or minutes (e.g. an electronic dissolved oxygen sensor that logs the DO saturation every 5 minutes).

An advantage of the present whiteboard environment is that it allows hydrologists and other environmental scientists working with time series data who have widely varying needs in terms of the types and order of tasks and processes to be performed on their data sets, flexibility in the ordering and inclusion or exclusion of processes; and the visualization of how all processes fit together. This flexibility leads to increased speed and simplicity when creating a process for managing environmental time series data.

Processes that can be applied to time series data sets are encapsulated into toolboxes. Each toolbox contains the GUI and algorithmic code for performing a specific task. For example, the Import from File toolbox contains the interface and specific code for importing time series data from files. The Rating Curve Development toolbox contains the user interface for development of stage (water level) to discharge (flow) curves. The Rating Curve Player toolbox which contains the algorithmic code for the application of the stage-discharge rating curve hydraulic model to a time series of stage data, and generates a time series of discharge data.

A further feature if the whiteboard is that data is passed from one toolbox (GUI Application) to another (thereby defining a compound process) by "Wires". Wires are colour coded for the types of data they carry; red wires represent rating curves, green wires represent time series data, etc. . . . Each toolbox must have at least its required input data (wires connected) to be run. Additionally toolboxes can be wired together without any data present on the wires connecting them. These wires are displayed as skinny wires and remain so until data is put onto them by GUI toolboxes 'up-wire'

The architecture of the whiteboard designed to be a hub through which XOP (XML Optimized Packaging) data (time series, rating curves, etc. . . . ) is passed as a binary buffer through named pipes to independent executables (toolboxes) running in separate execution threads.

The whiteboard is valuable in the field of scientific software since it allows for encapsulation of complex concepts within small manageable toolbox GUIs. Most scientific software user interfaces are burdened by trying to accomplish too many things with too little desktop real estate—functions are often buried in nested drop down menus or in unmanageable arrays of toolbar buttons. By having processes separated yet wired together as on the whiteboard each individual toolbox can provide an interface specific to its functionality without needing to be cluttered with the user interface or tools for tasks that were accomplished in other toolboxes (e.g. data acquisition and formatting).

Furthermore, by allowing users to "visually" pass data along wires on the whiteboard from one toolbox or process to another alleviates the often tedious tasks of reformatting data from one output file format to the input file format of the next step in a scientific process that uses multiple small yet specific software applications to complete a compound process. Furthermore the order of a process a scientist wishes to run his/her data through many vary. Thus the whiteboard allows the operator the flexibility to wire toolboxes in any order, so long as the correct colour wires are provided as inputs, an infinite range of process possibilities are possible. Furthermore, by wiring together toolboxes scientists can easily visualize and understand the process through which they are performing data management, validation, correction, visualization, modeling, reporting, and analysis.

The whiteboard allows for step by step execution of a process where each step represents a small application specific to accomplishing the task with the provided input data. Complex compound processes can be built up and stepped through simply by wiring together many toolboxes. The whiteboard could be looked at as an environment for specific small applications (blocks) to execute and send their results on to subsequent specific small applications (blocks). The whiteboard can be run autonomously when a process contains no toolboxes that require user intervention; for example, a data correction toolbox where a user needs to select with the mouse the regions of data requiring adjustment, could not be part of an autonomous process. Yet, the whiteboard can be run step by step with the user executing each toolbox by hand.

An additional feature of the whiteboard environment is the ability for certain types of toolboxes to have inputs of any data type. This is represented on the whiteboard as a black input port. When a toolbox with a black input port is connected to a coloured input wire the toolbox's functionality when run is specific to that data type. For example if a QuickView toolbox has rating curve data plugged into its input port it will produce a chart and table of the rating curve in log-log space with stage on the vertical axis and discharge on the horizontal axis. If instead a time series wire is plugged into a Quick View toolbox the toolbox displays a spreadsheet style view of the time series data with a linked time series plot of the data with time on the horizontal axis.

Although the invention has been described with reference to certain specific embodiments, various modifications thereof will be apparent to those skilled in the art without departing from the spirit and scope of the invention as outlined in the claims appended hereto.

We claim:

1. An apparatus providing a graphical user interface for graphically controlling the processing of hydrological data, comprising:
   a display menu interface listing executable tools from the group comprising one or more of: hydrological data input, hydrological data validity checking, hydrological data correction and hydrological modeling;
   a GUI for an operator to select, and arrange tools from said display menu on a graphical display to construct said hydrological process, the selected tools being represented by separate icons on said graphical display, and for the operator to establish a connection between at least one output of a first tool and an input of a second tool, by graphically displaying the connection between said tools representative icon; and
   input means for receiving user input to arrange and execute said constructed hydrological data processing.

2. A computer-based graphical user interface as defined in claim 1, said connection being represented wire graphical lines, a data type flowing between said ports being indicated by a visual attribute of said graphical line.

3. A computer-based graphical user interface as defined in claim 2, said visual attribute being a thickness of said line.

4. A computer-based graphical user interface as defined in claim 2, said visual attribute being a color.

5. A computer-based graphical user interface as defined in claim 1, said hydrological data being aquatic sensor data.

6. A computer-based graphical user interface as defined in claim 1, said hydrological data being time series data.

7. A computer-based graphical user interface as defined in claim 6, said time series data including meta data.

8. A computer-based graphical user interface as defined in claim 1, said hydrological data validity checking process being performed using a parity space algorithm.

9. A computer-based method for graphically constructing a hydrological processes, comprising the steps of:
   listing on a display menu interface executable tools from the group comprising one or more of: hydrological data input, hydrological data correction and hydrological modeling;
   selecting and arranging tools from said display menu on a graphical display to construct the hydrological process, the selected tools each being represented by icons on the graphical display and establishing a connection between at least one output of a first tool and an input of a second tool, by graphically displaying the connection between the tools representative icon; and
   receiving user input to execute said constructed hydrological process.

10. A computer-based method as defined in claim 9, including saving said constructed hydrological process and including said saved process in said group.

11. A method for automatic validation of time series data, comprising the steps of:
   listing on a display menu interface executable tools from the group comprising one or more of: hydrological data input, hydrological data correction and hydrological modeling;
   selecting and arranging tools from said display menu on a graphical display to construct the hydrological process, the selected tools each being represented by icons on the graphical display and establishing a connection between at least one output of a first tool and an input of a second tool, by graphically displaying the connection between the tools representative icon, at least one of said selected hydrological data correction tools including a parity space algorithm for data flagging; and
   receiving user input to execute constructed process.

* * * * *